(12) United States Patent
Bogg

(10) Patent No.: US 8,286,920 B2
(45) Date of Patent: Oct. 16, 2012

(54) POSITIONING SYSTEM FOR AERIAL REFUELING

(75) Inventor: Staffan Bogg, Vikingstad (SE)

(73) Assignee: SAAB AB, Linköping (SE)

( * ) Notice: Subject to any disclaimer, the term of this patent is extended or adjusted under 35 U.S.C. 154(b) by 879 days.

(21) Appl. No.: 12/240,394

(22) Filed: Sep. 29, 2008

(65) Prior Publication Data

US 2010/0282912 A1     Nov. 11, 2010

(30) Foreign Application Priority Data

Sep. 28, 2007   (EP) ..................................... 07117537

(51) Int. Cl.
*B64D 39/00*      (2006.01)
*G05D 1/00*       (2006.01)

(52) U.S. Cl. ........................ 244/135 A; 701/4

(58) Field of Classification Search .............. 244/135 R, 244/135 A; 701/3, 4, 10
See application file for complete search history.

(56) References Cited

U.S. PATENT DOCUMENTS

| | | | | |
|---|---|---|---|---|
| 3,285,544 A * | 11/1966 | Chope et al. | ............... | 244/135 A |
| 4,025,193 A * | 5/1977  | Pond et al.  | ..................... | 356/5.1 |
| 4,887,781 A * | 12/1989 | Browning et al. | ............ | 244/190 |
| 5,326,052 A * | 7/1994  | Krispin et al. | ............ | 244/135 A |
| 5,906,336 A   | 5/1999  | Eckstein | | |
| 6,254,035 B1  | 7/2001  | Howard | | |
| 6,604,711 B1  | 8/2003  | Stevens et al. | | |
| 6,669,145 B1* | 12/2003 | Green | ........................ | 244/135 A |
| 6,819,982 B2* | 11/2004 | Doane | .............................. | 701/3 |
| 6,889,941 B1* | 5/2005  | McElreath et al. | ....... | 244/135 A |
| 6,966,525 B1* | 11/2005 | Schroeder | ................. | 244/135 A |
| 7,152,828 B1* | 12/2006 | Garcia et al. | ............... | 244/135 A |
| 8,033,506 B2* | 10/2011 | Greene | ..................... | 244/135 A |
| 8,152,104 B2* | 4/2012  | Mouskis | .................... | 244/135 R |
| 2004/0102876 A1 | 5/2004 | Doane | | |
| 2006/0208132 A1* | 9/2006 | Jones | ............................. | 244/10 |
| 2009/0045290 A1* | 2/2009 | Small et al. | ............... | 244/135 A |

OTHER PUBLICATIONS

European Search Report—Feb. 14, 2008.

* cited by examiner

*Primary Examiner* — Bret Hayes
(74) *Attorney, Agent, or Firm* — Venable LLP; Eric J. Franklin

(57) ABSTRACT

A positioning system for aerial refueling of an aircraft provided with a first element for connection with a second element arranged on a tanker plane. The first and second elements are adapted to feed fuel from the tanker plane to the aircraft. A receiver on the aircraft is arranged to receive signals from the second element. A control unit on the aircraft controls the aircraft depending on the signals to steer the aircraft to a position for connecting the first and second elements.

7 Claims, 4 Drawing Sheets

POSITIONING SYSTEM FOR AERIAL REFUELING

CROSS-REFERENCE TO RELATED APPLICATIONS

Figure 1:
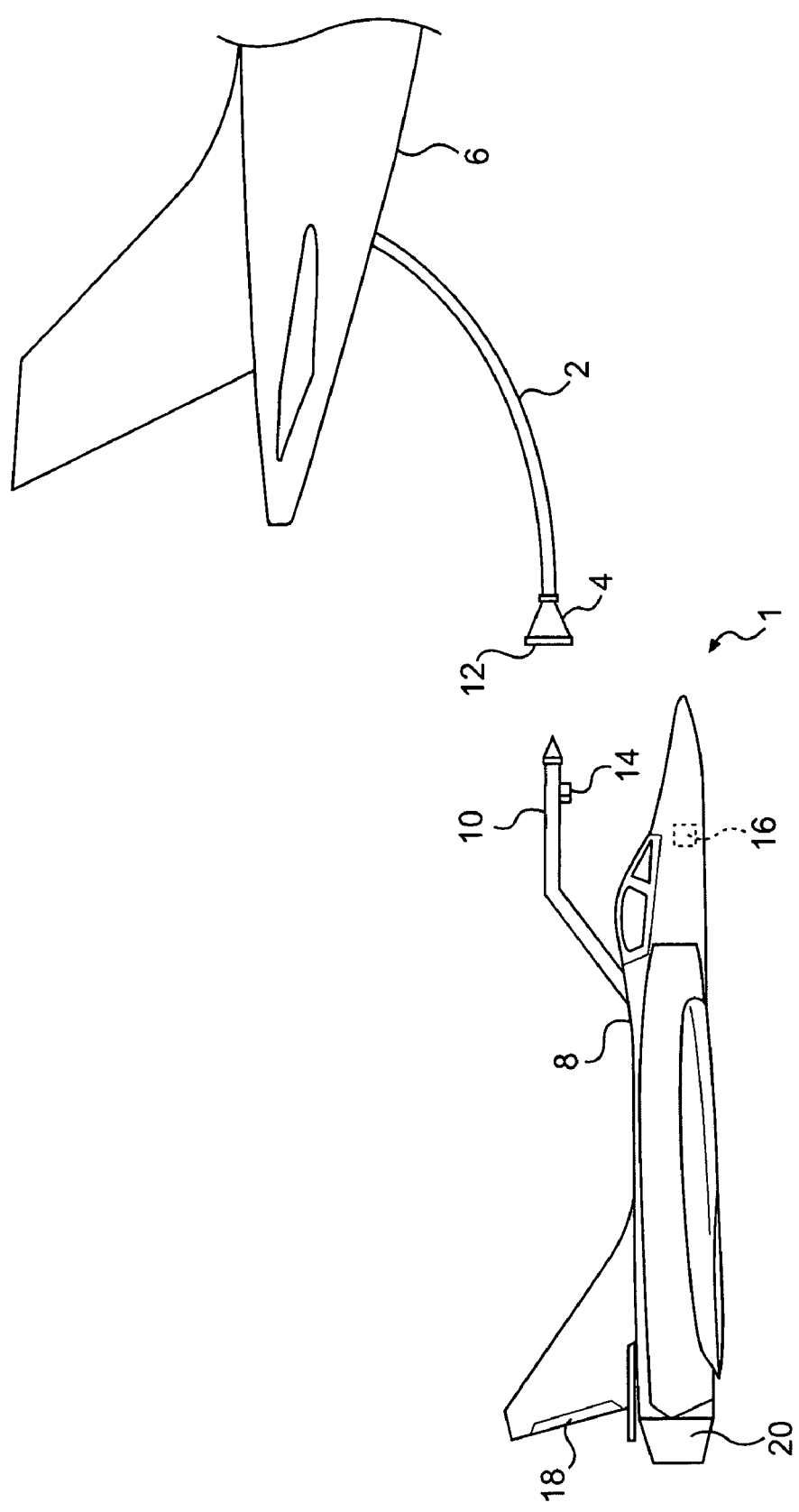

This application claims priority to European patent application 07117537.6 filed 28 Sep. 2007.

This invention relates to a positioning system for areal refueling of aircraft, such as unmanned aircraft or aircraft with a pilot flying the aircraft.

Aerial refueling is used to extend the range of aircraft and is especially employed by the military. A flying boom or a hose with a drogue is extended from a tanker plane. If a flying boom is used a boom operator in the tanker plane steers the boom into a receiving probe or a refueling receptacle of the aircraft to be refueled. When a hose and drogue system is used the pilot of the aircraft to be refueled flies the receiving probe into the drogue. Several hose and drogue units may be installed on the tanker plane so that several aircraft can be refueled simultaneously.

Flying the aircraft to be refueled in order to connect the receiving probe with the drogue is often a complicating and demanding task for the pilot. Also, it is a complicated task for the boom operator to connect the flying boom with the aircraft to be refueled. Over open water it is sometime necessary to refuel the aircraft in order to arrive to a destination airfield and an unsuccessful connection between the aircraft and the tanker plane results in loosing the aircraft to be refueled due to engine stop.

Document U.S. Pat. No. 6,604,711-B 1 discloses an autonomous system for the aerial refueling or decontamination of unmanned airborne vehicles, in which a motor operates a hose reel for positioning of the drogue. Also, aerodynamic lifting surfaces and radial thrust on the drogue are used for motion control of the drogue. A radio transponder is arranged on the tanker plane for transmitting signals to and receiving signals from a transponder arranged on the unmanned aircraft. The signals received from the unmanned aircraft indicate the relative positions between the aircraft and the tanker plane and is used for controlling the drogue.

One drawback with the known aerial refueling system is the dependence between the tanker aircraft and the unmanned aircraft to be refueled. Not any unmanned aircraft may be refueled by the tanker aircraft. Another drawback with the known system is that the likelihood for an error in the system increases when using a wireless data connection in both direction between the tanker plane and the aircraft to be refueled. Time lag in the data link between the tanker plane and the aircraft to be refueled may also occur.

The objective problem to be solved by the present invention is to provide a positioning system for aerial refueling with improved accuracy and reliability.

Another objective problem to be solved by the present invention is to achieve a positioning system for aerial refueling which is compatible with any aircraft to be refueled.

Since the aircraft to be refueled is provided with a receiver, signals are transmitted only in one direction from the drogue or the boom nozzle to the aircraft. Therefore, the likelihood for an error due to time lag in the data link is minimized.

In one embodiment of the positioning system according to the invention, optical signals from the drogue are detected by the receiver on the aircraft. The optical signals may be a pattern in different colours or black and white fields, light from emitting diodes, infra red light or laser arranged on the drogue or nozzle. The receiver detects the signals and processes them. Depending on the signals the aircraft is manoeuvred by a control unit to an end position for connecting the probe with the drogue or the nozzle with the receptacle.

In another embodiment acoustic signals from the drogue are detected by the receiver on the aircraft. The acoustic signals may have a specific frequency emitted from the drogue or nozzle. The receiver detects the signals and processes them. Depending on the signals the aircraft is manoeuvred by a control unit to an end position for connecting the probe with the drogue or the nozzle with the receptacle.

Both position systems with optical and acoustic signals could be made compatible to any aircraft which is provided with a receiver for receiving optical and/or acoustic signals.

Other advantages and features of the invention can be derived from the following detailed description of exemplary embodiments of the invention, with reference to the drawings.

Figure 2:
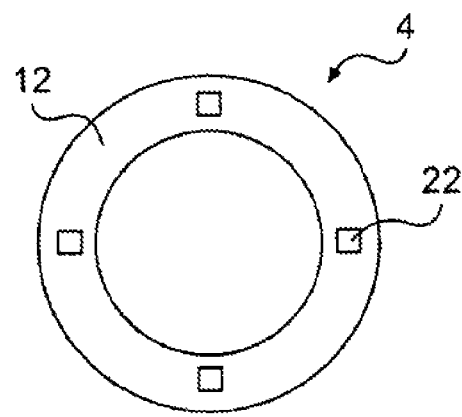
Figure 3:
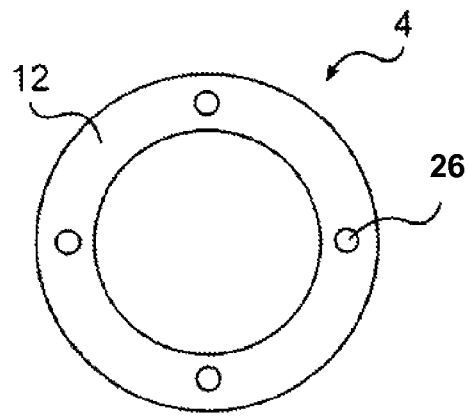
Figure 4:
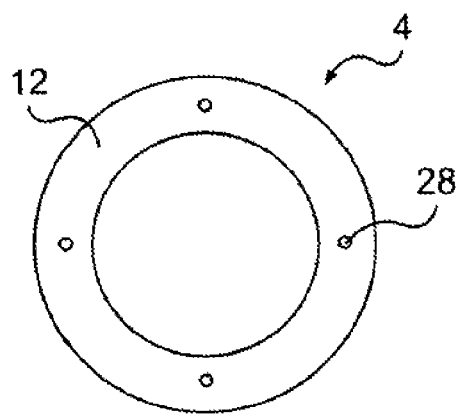
Figure 5:
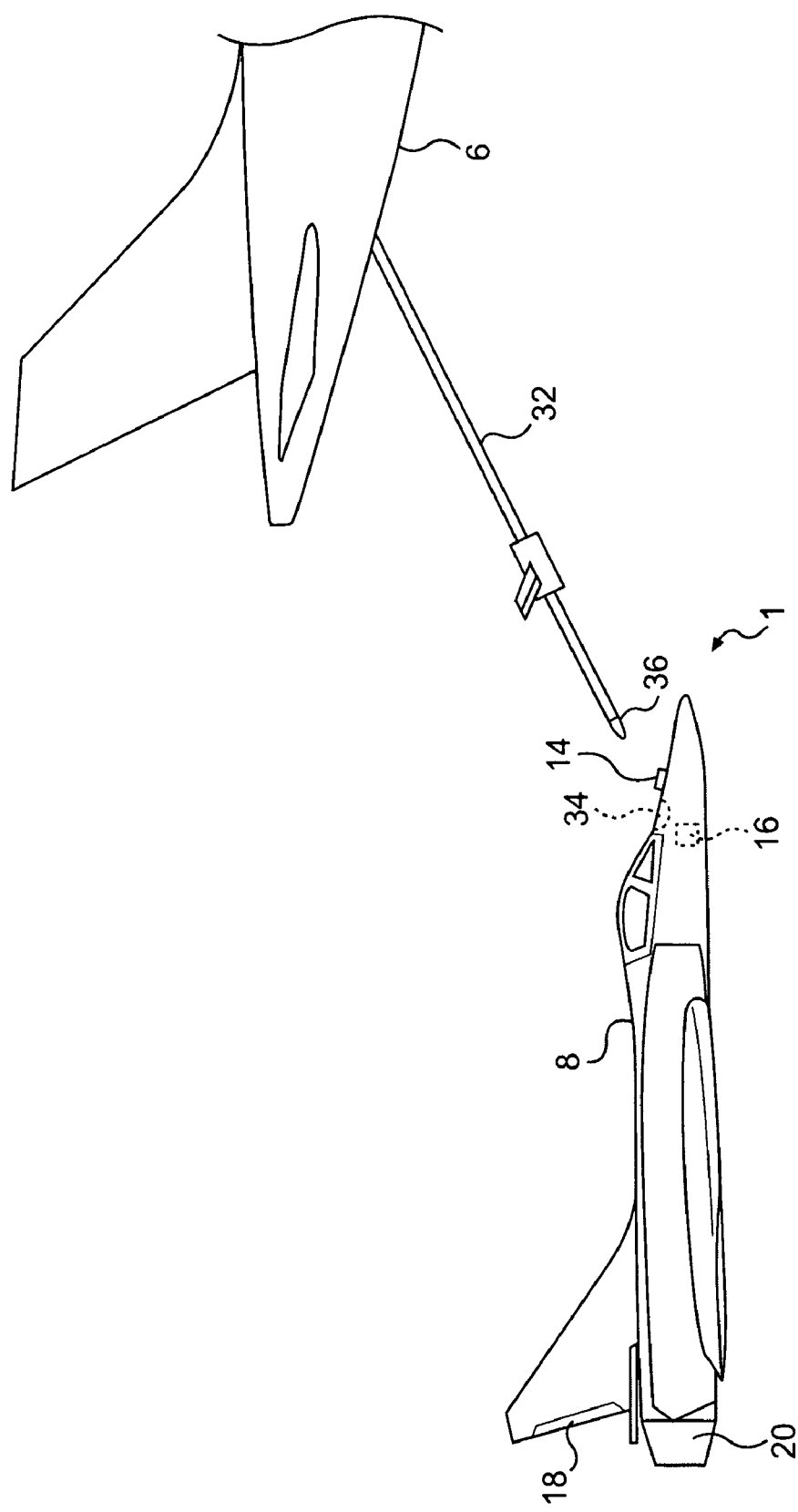
Figure 6:
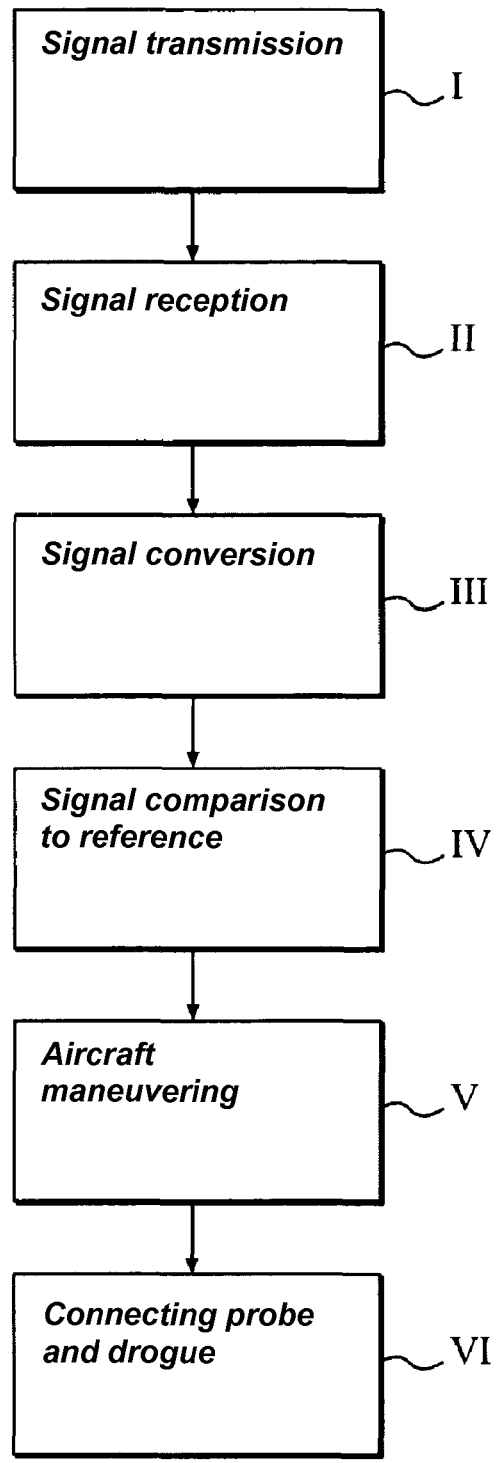

FIG. 1 is a schematic view of an aerial refueling with a positioning system according to the invention using a probe and drogue, FIG. 2 is a first embodiment of a positioning system according to the invention, FIG. 3 is a second embodiment of a positioning system according to the invention, FIG. 4 is a third embodiment of a positioning system according to the invention, FIG. 5 is a schematic view of an aerial refueling with a positioning system according to the invention using a receptacle and a boom nozzle, and FIG. 6 is a block diagram of the positioning system according to the invention.

FIG. 1 is a schematic view of an aerial refueling with a positioning system 1 according to the invention. A hose 2 with a drogue 4 is extended from a tanker plane 6. An aircraft 8 to be refueled is provided with a receiving probe 10 which is arranged to be connected to the drogue 4. The probe 10 and drogue 4 are adapted to feed fuel from the tanker plane 6 to the aircraft 8. In FIG. 1 only one hose 2 and drogue 4 is arranged on the tanker plane 6. However, several hose 2 and drogue 4 units may be installed on the tanker plane 6 so that several aircrafts 8 can be refueled simultaneously. The drogue 4 is of a substantially circular, conical shape with a substantially circular surface 12 facing the aircraft 8 to be refueled.

The positioning system 1 comprises a receiver 14 arranged on the aircraft 8 to receive signals from the drogue 4. In the embodiment disclosed in FIG. 1 the receiver 14 is mounted on the probe 10. However, the receiver 14 could be mounted at any suitable location on the aircraft 8. A control unit 16 on the aircraft 8 controls the aircraft 8 depending on the signals to steer the aircraft 8 to an end position for connecting the probe 10 with the drogue 4. The control unit 16 is connected to control surfaces 18 on the aircraft 8 in order steer and manoeuvre the aircraft 8 to an end position, which is the position where the probe 10 and the drogue 4 are connected. The control unit 16 may be an assembly of several control units with different functions. Also, the thrust of the main engine 20 of the aircraft 8 is controlled to manoeuvre the aircraft 8 to the end position.

The aircraft 8 may be an unmanned aircraft 8 or an aircraft 8 with a pilot flying the aircraft 8. When an unmanned aircraft 8 is refueled, the refueling must be totally automated. Also, when there is a pilot flying the aircraft 8 the refueling can be totally automated.

When the aircraft 8 should be refueled the pilot flies the aircraft 8 in the vicinity of the tanker plane 6. Thereafter the control unit 16 automatically takes over the manoeuvring of the aircraft 8 for connecting the probe 10 with the drogue 4.

The unmanned aircraft 8 is manoeuvred to the vicinity of the tanker plane 6 by radio control or by using other means for controlling the aircraft 8. Thereafter the control unit 16 automatically takes over the manoeuvring of the aircraft 8 for connecting the probe 10 with the drogue 4.

FIG. 2 is a first embodiment of a positioning system 1 according to the invention. In this embodiment the signal is a pattern of different colours 22 arranged on the circular surface 12 of the drogue 4 and the receiver 14 is an optical sensor arranged on the aircraft 8. The pattern may be black fields arranged on a white background. It is also possible to arrange white fields on a black background. When the optical sensor receives the signal in form of an image from the drogue 4 the signal is transferred to the control unit 16 and is converted to a plurality of pixels and processed in the control unit 16, so that the probe 10 can be connected with the drogue 4.

According to an embodiment it may be possible to store a reference image and compare it with the converted image. The aircraft 8 is manoeuvred to minimize the difference between the converted image and the reference image. When the difference between the converted image and the reference image is less than a determined value the probe 10 and drogue 4 will be connected by flying the probe 10 into the drogue 4.

FIG. 3 is a second embodiment of a positioning system 1 according to the invention. In this embodiment the signal is a pattern of light sources 26 arranged on the drogue 4 and in that the receiver 14 is an optical sensor arranged on the aircraft 8. The light sources 26 may be light emitting diodes, infra red lights or lasers. Connection of the probe 10 with the drogue 4 may be arranged in the same way as described in the embodiment above.

FIG. 4 is a third embodiment of a positioning system 1 according to the invention. In this embodiment the signal is an acoustic signal 28 transmitted from the drogue 4 and in that the receiver 14 is an acoustic receiver arranged on the aircraft 8. The acoustic signal 28 may have a specific frequency emitted from the drogue 4. The acoustic receiver detects the signals and the signals are processed in the control unit 16. The detected acoustic signal 28 is processed in the control unit 16. Depending on the signals the aircraft 8 is manoeuvred by a control unit 16 to the end position for connecting the probe 10 with the drogue 4.

According to an embodiment it may be possible to store a reference acoustic signal 28 and compare it with the converted image. The aircraft 8 is manoeuvred to minimize the difference between the detected acoustic signal 28 and the reference acoustic signal 28. When the difference between the detected acoustic signal 28 and the reference acoustic signal 28 is less than a determined value the probe 10 and drogue 4 will be connected by flying the probe 10 into the drogue 4.

FIG. 5 is a schematic view of an aerial refueling with a positioning system 1 in which a flying boom 32 is extended from the tanker plane 6. The aircraft 8 to be refueled is provided with a receiving receptacle 34 which is arranged to be connected to a boom nozzle 36 arranged in the end of the flying boom 32. The receptacle 34 and the nozzle 36 are adapted to feed fuel from the tanker plane 6 to the aircraft 8. A receiver 14 is arranged on the aircraft 8 to receive signals from the nozzle 36. The control unit 16 on the aircraft 8 controls the aircraft 8 depending on the signals to steer the aircraft 8 to an end position for connecting the receptacle 34 with the boom nozzle 36. The control unit 16 is connected to control surfaces 18 of the aircraft 8 in order steer and manoeuvre the aircraft 8 to an end position where the receptacle 34 and the nozzle 36 are connected. The control unit 16 also controls the thrust of the main engine 20 of the aircraft 8 to manoeuvre the aircraft 8 to the end position. The positioning system 1 described above in connection with the drogue 4 and probe 10 is also applicable to the nozzle 36 and receptacle 34 described in connection with FIG. 5.

The probe 10 and receptacle 34 can be arranged at any suitable location on the aircraft 8. Since the control unit 16 automatically takes over the manoeuvring of the aircraft 8 for connecting the probe 10 with the drogue 4 the pilot do not need to have visibly control of the connection. On an unmanned aircraft 8 it is also possible to arrange the probe 10 or receptacle 34 on the underside of the aircraft 8, so that the aircraft 8 may be inverted during refueling.

FIG. 6 is a block diagram of the positioning system 1 according to an embodiment of the invention. In I a signal is transmitted from the drogue 4 or nozzle 36 and in II the signal received by the receiver 14 in the aircraft 8. The received signal is thereafter in III converted in the control unit 16 and in IV compared with a stored reference signal. The received signal is converted into a form so that the converted signal is comparable with the reference signal. The reference signal may be stored in the control unit 16. In V the aircraft 8 is manoeuvred to minimize the difference between the converted signal and the reference signal. In VI the probe 10 and drogue 4 resp. receptacle 34 and nozzle 36 are connected when the difference between the converted signal and the reference signal is less than a determined value.

The invention claimed is:

1. A positioning system for aerial refueling of an aircraft comprising fuel receiver for connection with a fuel feeder arranged on a tanker plane, wherein the fuel receiver and fuel feeder are adapted to feed fuel from the tanker plane to the aircraft, the positioning system comprising:
   a beacon signal provided on the fuel feeder, wherein the beacon signal produces a fixed signal comprising a pattern comprising different colors, black and white fields, light sources or acoustic signals,
   a receiver comprising an optical sensor or an acoustic receiver arranged on the aircraft and arranged to a detect the signal, and
   a control unit on the aircraft,
   wherein the received signal is transferred from the receiver to the control unit and is processed in the control unit, and wherein the control unit is arranged to control the aircraft depending on the signal to steer the aircraft to a position for connecting the fuel receiver and the fuel feeder.

2. The positioning system according to claim 1, wherein the received signal is converted in the control unit and compared with a reference signal, and wherein the aircraft is manoeuvred to minimize a difference between the converted signal and the reference signal.

3. The positioning system according to claim 2, wherein the fuel receiver and the fuel feeder are connected when the difference between the converted signal and the reference signal is less than a determined value.

4. The positioning system according to claim 1, wherein the control unit also controls the thrust of a main engine of the aircraft to manoeuvre the aircraft to the position for connecting the fuel receiver and fuel feeder.

5. The positioning system according to claim 1, wherein the fuel receiver comprises a probe and the fuel feeder comprises a drogue arranged on a hose which is connected to the tanker plane.

6. The positioning system according to claim 1, wherein the fuel receiver comprises a receptacle and the fuel feeder comprises a boom nozzle arranged on a flying boom which is connected to the tanker plane.

7. The positioning system according to claim 1, wherein the aircraft is unmanned.

* * * * *